(12) United States Patent
Amini

(10) Patent No.: US 12,424,344 B2
(45) Date of Patent: Sep. 23, 2025

(54) ELECTRODE FABRICATION AND DIE SHAPING FOR METAL-ON-GLASS ION TRAPS

(71) Applicant: IonQ, Inc., College Park, MD (US)

(72) Inventor: Jason Madjdi Amini, Takoma Park, MD (US)

(73) Assignee: IonQ, Inc., College Park, MD (US)

( * ) Notice: Subject to any disclaimer, the term of this patent is extended or adjusted under 35 U.S.C. 154(b) by 590 days.

(21) Appl. No.: 17/876,219

(22) Filed: Jul. 28, 2022

(65) Prior Publication Data

US 2023/0034306 A1 Feb. 2, 2023

Related U.S. Application Data

(60) Provisional application No. 63/227,104, filed on Jul. 29, 2021.

(51) Int. Cl.
*G21K 1/00* (2006.01)
*G06N 10/60* (2022.01)

(52) U.S. Cl.
CPC ............... *G21K 1/00* (2013.01); *G06N 10/60* (2022.01)

(58) Field of Classification Search
CPC .......... G06N 10/40; G06N 10/60; G21K 1/00; H01J 49/422
See application file for complete search history.

(56) References Cited

FOREIGN PATENT DOCUMENTS

| EP | 2913839 A1 | 9/2015 | |
| WO | WO-2015128438 A1 * | 9/2015 | ........... G06N 99/002 |

OTHER PUBLICATIONS

Araneda et al., "The Panopticon device: an integrated Paul-trap-hemispherical mirror system for quantum optics," Oct. 17, 2020, arXiv.org, 16 pages (Year: 2020).*
International Search Report and Written Opinion in PCT/US2022/074320, mailed May 31, 2023, 10 pages.
Araneda et al., "The Panopticon device: an integrated Paul-trap-hemispherical mirror system for quantum optics," arXiv.org, 2020, 16 pages.

* cited by examiner

*Primary Examiner* — David E Smith
*Assistant Examiner* — Hsien C Tsai
(74) *Attorney, Agent, or Firm* — ARENTFOX SCHIFF LLP

(57) ABSTRACT

Techniques for the fabrication of electrodes and the shaping of glass dies or substrates are described to produce metal-on-glass ion traps. These ion traps may be configured to have open light access and high aspect trenches for the electrodes. For example, the glass substrate may be shaped to provide high numerical aperture (NA) light access by having angled cutouts, electrode structures with high aspect trenches, angled wire bonds for electrical connections, the angled wire bonds providing additional clear access by one or more laser beams, or a combination of any of these features. A quantum information processing (QIP) system is also described that may include an ion trap having any of these features.

18 Claims, 8 Drawing Sheets

ELECTRODE FABRICATION AND DIE SHAPING FOR METAL-ON-GLASS ION TRAPS

PRIORITY

This application claims priority to and the benefit from U.S. Provisional Application No. 63/227,104, filed on Jul. 29, 2021, and titled "Electrode Fabrication and Die Shaping for Metal-on-Glass Ion Traps," the contents of which are incorporated herein by reference in their entirety.

BACKGROUND

Aspects of the present disclosure relate generally to trapping devices for use in the implementation, operation, and/or use of quantum information processing (QIP) systems.

Trapped atoms are one of the leading implementations for quantum information processing or quantum computing. Atomic-based qubits may be used as quantum memories, as quantum gates in quantum computers and simulators, and may act as nodes for quantum communication networks. Qubits based on trapped atomic ions enjoy a rare combination of attributes. For example, qubits based on trapped atomic ions have very good coherence properties, may be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

It is therefore important to develop new techniques that improve the design, fabrication, implementation, control, and/or functionality of different QIP systems used as quantum computers or quantum simulators, and particularly for those QIP systems that handle operations based on atomic-based qubits.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

This disclosure describes various aspects of techniques for the fabrication of electrodes and the shaping of glass dies or substrates to produce metal-on-glass ion traps for use in QIP systems. These ion traps may be configured to have open light access and electrodes with high aspect trenches. For example, the glass substrate may be shaped to provide high numerical aperture (NA) light access by having angled cutouts, electrode structures with high aspect trenches, angled wire bonds for electrical connections, the angled wire bonds providing additional clear access by one or more laser beams, or a combination of any of these features. A QIP system is also described that may include an ion trap having any of these features.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings or figures is intended as a description of various configurations or implementations and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details or with variations of these specific details. In some instances, well known components are shown in block diagram form, while some blocks may be representative of one or more well known components.

For some traps used in QIP systems it would be helpful to implement designs and fabrication techniques that allow for better access by one or more laser or optical beams to the region of interest (e.g., where atomic-based qubits are located), while at the same time providing good isolation between the various electrodes used for the operation of the trap. This may be achieved by appropriately shaping the glass substrate on which the trap is formed to produce high NA light access and electrode structures with high aspect trenches.

Solutions to the issues described above are explained in more detail in connection with FIGS. 1-8, with FIGS. 1-3 providing a background of QIP systems or quantum computers, and more specifically, of atomic-based QIP systems or quantum computers.

Figure 1:
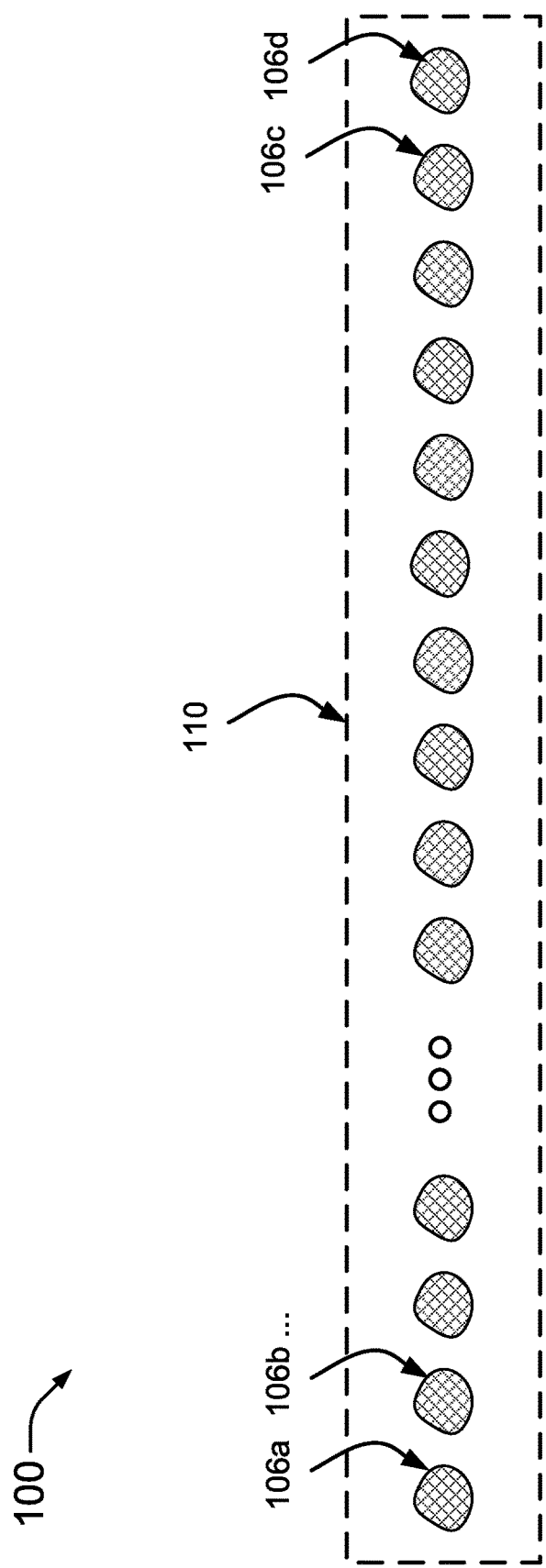
FIG. 1 illustrates a view of atomic ions a linear crystal or chain in accordance with aspects of this disclosure.
Figure 2:
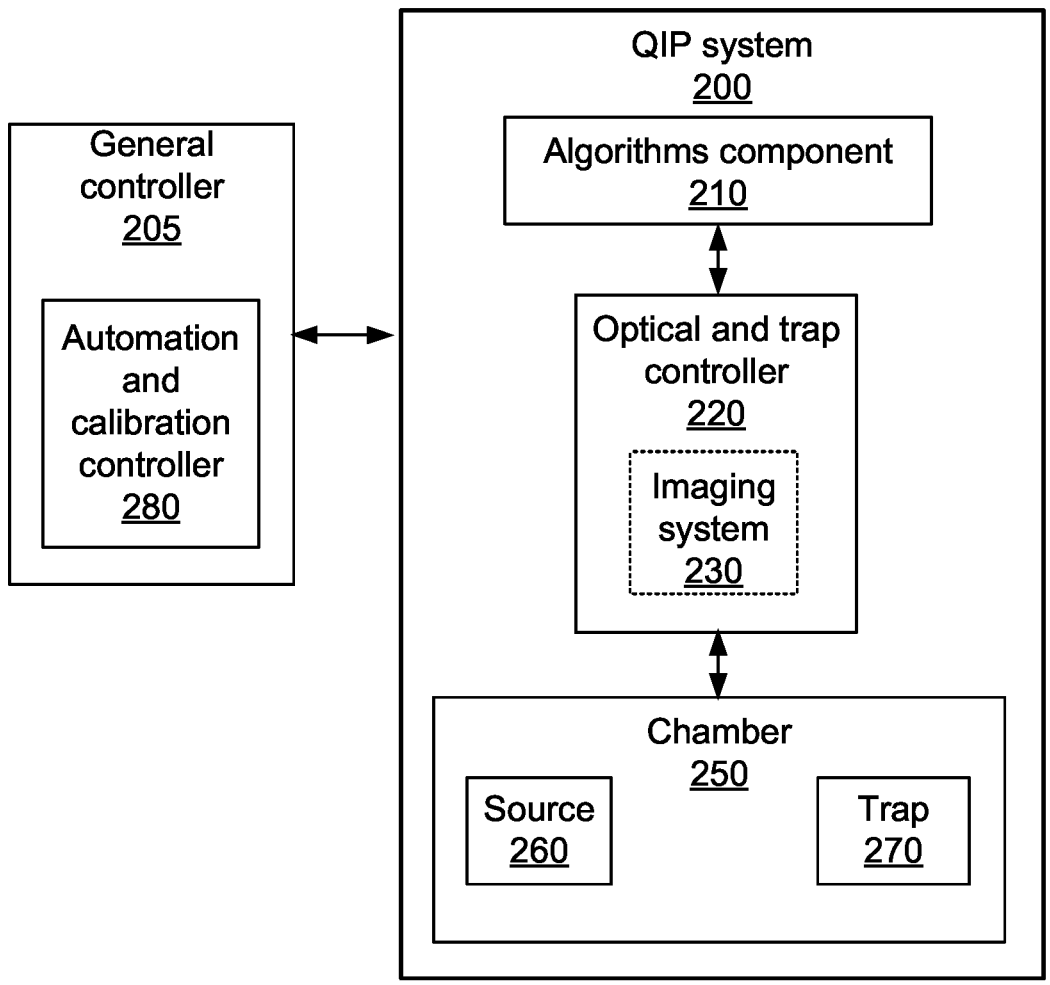
FIG. 2 illustrates an example of a quantum information processing (QIP) system in accordance with aspects of this disclosure.

FIG. 1 illustrates a diagram 100 with multiple atomic ions or ions 106 (e.g., ions 106a, 106b, . . . , 106c, and 106d) trapped in a linear crystal or chain 110 using a trap (not shown; the trap can be inside a vacuum chamber as shown in FIG. 2). The trap may be referred to as an ion trap. The ion trap shown may be built or fabricated on a semiconductor substrate, a dielectric substrate, or a glass die or wafer (also referred to as a glass substrate). Several features and fabrication techniques of ion traps related to this disclosure are described below in connection with FIGS. 4-8. The ions 106 may be provided to the trap as atomic species for ionization and confinement into the chain 110. Some or all of the ions 106 may be configured to operate as qubits in a QIP system.

In the example shown in FIG. 1, the trap includes electrodes for trapping or confining multiple ions into the chain 110 laser-cooled to be nearly at rest. The number of ions trapped can be configurable and more or fewer ions may be trapped. The ions may be ytterbium ions (e.g., $^{171}Yb^+$ ions), for example. The ions are illuminated with laser (optical) radiation tuned to a resonance in $^{171}Yb^+$ and the fluorescence of the ions is imaged onto a camera or some other type of detection device (e.g., photomultiplier tube or PMT). In this example, ions may be separated by a few microns (μm) from each other, although the separation may vary based on architectural configuration. The separation of the ions is determined by a balance between the external confinement force and Coulomb repulsion and does not need to be uniform. Moreover, in addition to ytterbium ions, barium ions, neutral atoms, Rydberg atoms, or other types of atomic-based qubit technologies may also be used. Moreover, ions of the same species, ions of different species, and/or different isotopes of ions may be used. The trap may be a linear RF Paul trap, but other types of confinement devices may also be used, including optical confinements. Thus, a confinement device may be based on different techniques and may hold ions, neutral atoms, or Rydberg atoms, for example, with an ion trap being one example of such a confinement device. The ion trap may be a surface trap, for example.

FIG. 2 illustrates a block diagram that shows an example of a QIP system 200. The QIP system 200 may also be referred to as a quantum computing system, a quantum computer, a computer device, a trapped ion system, or the like. The QIP system 200 may be part of a hybrid computing system in which the QIP system 200 is used to perform quantum computations and operations and the hybrid computing system also includes a classical computer to perform classical computations and operations. The quantum and classical computations and operations may interact in such a hybrid system.

Shown in FIG. 2 is a general controller 205 configured to perform various control operations of the QIP system 200. These control operations may be performed by an operator, may be automated, or a combination of both. Instructions for at least some of the control operations may be stored in memory (not shown) in the general controller 205 and may be updated over time through a communications interface (not shown). Although the general controller 205 is shown separate from the QIP system 200, the general controller 205 may be integrated with or be part of the QIP system 200. The general controller 205 may include an automation and calibration controller 280 configured to perform various calibration, testing, and automation operations associated with the QIP system 200. These calibration, testing, and automation operations may involve, for example, all or part of an algorithms component 210, all or part of an optical and trap controller 220 and/or all or part of a chamber 250.

The QIP system 200 may include the algorithms component 210 mentioned above, which may operate with other parts of the QIP system 200 to perform or implement quantum algorithms, quantum applications, or quantum operations. The algorithms component 210 may be used to perform or implement a stack or sequence of combinations of single qubit operations and/or multi-qubit operations (e.g., two-qubit operations) as well as extended quantum computations. The algorithms component 210 may also include software tools (e.g., compilers) that facility such performance or implementation. As such, the algorithms component 210 may provide, directly or indirectly, instructions to various components of the QIP system 200 (e.g., to the optical and trap controller 220) to enable the performance or implementation of the quantum algorithms, quantum applications, or quantum operations. The algorithms component 210 may receive information resulting from the performance or implementation of the quantum algorithms, quantum applications, or quantum operations and may process the information and/or transfer the information to another component of the QIP system 200 or to another device (e.g., an external device connected to the QIP system 200) for further processing.

The QIP system 200 may include the optical and trap controller 220 mentioned above, which controls various aspects of a trap 270 in the chamber 250, including the generation of signals that are applied to electrodes in the trap 270 to control the trap 270. For example, the optical and trap controller 220 may be configured to control the generation of radio frequency (RF) signals to be applied to RF electrodes in the trap 270 and direct current (DC) signals to be applied to DC electrodes in the trap 270. Several features and fabrication techniques of ion traps related to this disclosure that may be used for the trap 270 and are described below in connection with FIGS. 4-8.

The optical and trap controller 220 may also control the operation of lasers, optical systems, and optical components that are used to provide the laser or optical beams that interact with the atoms or ions in the trap. Optical systems that include multiple components may be referred to as optical assemblies. The optical beams are used to set up the ions, to perform or implement quantum algorithms, quantum applications, or quantum operations with the ions, and to read results from the ions. Control of the operations of laser, optical systems, and optical components may include dynamically changing operational parameters and/or configurations, including controlling positioning using motorized mounts or holders. When used to confine or trap ions, the trap 270 may be referred to as an ion trap. The trap 270, however, may also be used to trap neutral atoms, Rydberg atoms, and other types of atomic-based qubits. The lasers, optical systems, and optical components can be at least partially located in the optical and trap controller 220, an imaging system 230, and/or in the chamber 250.

The QIP system 200 may include the imaging system 230. The imaging system 230 may include a high-resolution imager (e.g., CCD camera) or other type of detection device (e.g., PMT) for monitoring the ions while they are being provided to the trap 270 and/or after they have been provided to the trap 270 (e.g., to read results). In an aspect, the imaging system 230 can be implemented separate from the optical and trap controller 220, however, the use of fluorescence to detect, identify, and label ions using image processing algorithms may need to be coordinated with the optical and trap controller 220.

In addition to the components described above, the QIP system 200 may include a source 260 that provides atomic species (e.g., a plume or flux of neutral atoms) to the chamber 250 having the trap 270. When atomic ions are the basis of the quantum operations, that trap 270 confines the atomic species once ionized (e.g., photoionized). The trap 270 may be part of what may be referred to as a processor or processing portion of the QIP system 200. That is, the trap 270 may be considered at the core of the processing operations of the QIP system 200 since it holds the atomic-based qubits that are used to perform or implement the quantum operations or simulations. At least a portion of the source 260 may be implemented separate from the chamber 250.

It is to be understood that the various components of the QIP system 200 described in FIG. 2 are described at a high-level for ease of understanding. Such components may include one or more sub-components, the details of which may be provided below as needed to better understand certain aspects of this disclosure.

Aspects of this disclosure may be implemented at least partially in connection with the trap 270.

Figure 3:
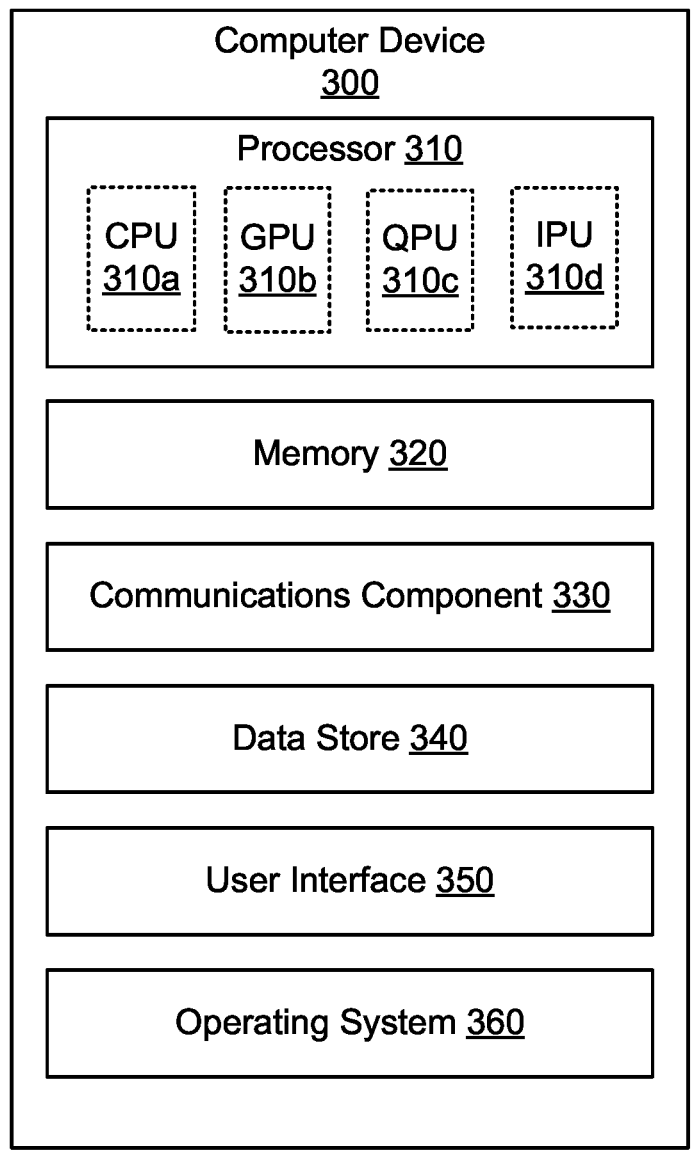
FIG. 3 illustrates an example of a computer device in accordance with aspects of this disclosure.

Referring now to FIG. 3, an example of a computer system or device 300 is shown. The computer device 300 may represent a single computing device, multiple computing devices, or a distributed computing system, for example. The computer device 300 may be configured as a quantum computer (e.g., a QIP system), a classical computer, or to perform a combination of quantum and classical computing functions, sometimes referred to as hybrid functions or operations. For example, the computer device 300 may be used to process information using quantum algorithms, classical computer data processing operations, or a combination of both. In some instances, results from one set of operations (e.g., quantum algorithms) are shared with another set of operations (e.g., classical computer data processing). A generic example of the computer device 300 implemented as a QIP system capable of performing quantum computations and simulations is, for example, the QIP system 200 shown in FIG. 2.

The computer device 300 may include a processor 310 for carrying out processing functions associated with one or more of the features described herein. The processor 310 may include a single processor, multiple set of processors, or one or more multi-core processors. Moreover, the processor 310 may be implemented as an integrated processing system and/or a distributed processing system. The processor 310 may include one or more central processing units (CPUs) 310*a*, one or more graphics processing units (GPUs) 310*b*, one or more quantum processing units (QPUs) 310*c*, one or more intelligence processing units (IPUs) 310*d* (e.g., artificial intelligence or AI processors), or a combination of some or all those types of processors. In one aspect, the processor 310 may refer to a general processor of the computer device 300, which may also include additional processors 310 to perform more specific functions (e.g., including functions to control the operation of the computer device 300). Quantum operations may be performed by the QPUs 310*c*. Some or all of the QPUs 310*c* may use atomic-based qubits, however, it is possible that different QPUs are based on different qubit technologies.

The computer device 300 may include a memory 320 for storing instructions executable by the processor 310 to carry out operations. The memory 320 may also store data for processing by the processor 310 and/or data resulting from processing by the processor 310. In an implementation, for example, the memory 320 may correspond to a computer-readable storage medium that stores code or instructions to perform one or more functions or operations. Just like the processor 310, the memory 320 may refer to a general memory of the computer device 300, which may also include additional memories 320 to store instructions and/or data for more specific functions.

It is to be understood that the processor 310 and the memory 320 may be used in connection with different operations including but not limited to computations, calculations, simulations, controls, calibrations, system management, and other operations of the computer device 300, including any methods or processes described herein.

Further, the computer device 300 may include a communications component 330 that provides for establishing and maintaining communications with one or more parties utilizing hardware, software, and services. The communications component 330 may also be used to carry communications between components on the computer device 300, as well as between the computer device 300 and external devices, such as devices located across a communications network and/or devices serially or locally connected to computer device 300. For example, the communications component 330 may include one or more buses, and may further include transmit chain components and receive chain components associated with a transmitter and receiver, respectively, operable for interfacing with external devices. The communications component 330 may be used to receive updated information for the operation or functionality of the computer device 300.

Additionally, the computer device 300 may include a data store 340, which can be any suitable combination of hardware and/or software, which provides for mass storage of information, databases, and programs employed in connection with the operation of the computer device 300 and/or any methods or processes described herein. For example, the data store 340 may be a data repository for operating system 360 (e.g., classical OS, or quantum OS, or both). In one implementation, the data store 340 may include the memory 320. In an implementation, the processor 310 may execute the operating system 360 and/or applications or programs, and the memory 320 or the data store 340 may store them.

The computer device 300 may also include a user interface component 350 configured to receive inputs from a user of the computer device 300 and further configured to generate outputs for presentation to the user or to provide to a different system (directly or indirectly). The user interface component 350 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 350 may include one or more output devices, including but not limited to a display, a speaker, a haptic feedback mechanism, a printer, any other mechanism capable of presenting an output to a user, or any combination thereof. In an implementation, the user interface component 350 may transmit and/or receive messages corresponding to the operation of the operating system 360. When the computer device 300 is implemented as part of a cloud-based infrastructure solution, the user interface component 350 may be used to allow a user of the cloud-based infrastructure solution to remotely interact with the computer device 300.

In connection with the systems described in FIGS. 1-3, it would be helpful to design and fabricate ion traps configured to have open light access and electrodes with high aspect trenches to improve the operation of the ion trap and, therefore, improve the overall operation of the QIP system.

Figure 4:
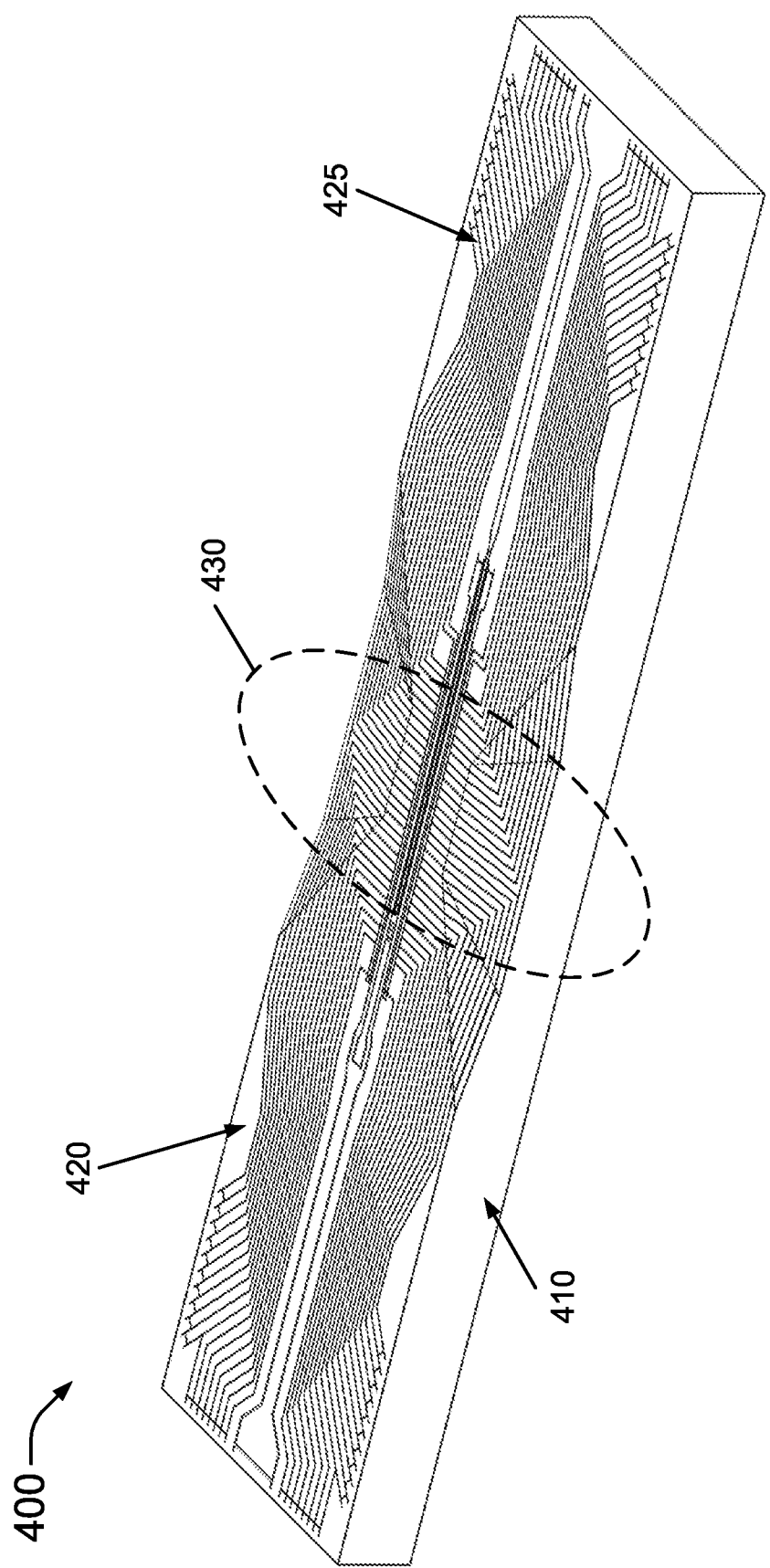
FIG. 4 illustrates an isometric view of an example of a metal-on-glass ion trap in connection with aspects of this disclosure.

FIG. 4 shows a diagram 400 that illustrates an isometric view of a metal-on-glass trap configured to provide open light access and electrodes with high aspect trenches. This example of a metal-on-glass trap is configured for use with ion-based qubits and is therefore referred to as an ion trap, although as described above metal-on-glass traps may be used with different types of qubits. The ion trap shown may be built or fabricated on a glass die or wafer 410, also referred to as a glass substrate. As shown, the glass substrate 410 may be an elongated device, where one direction may be along the length of the device and another direction may be along the width of the device. Although shown to have a rectangular shape in this example, the glass substrate 410 need not be limited to such a shape. An example of a material used for such glass substrates is fused silica, but other glass-like materials may also be used.

The ion trap may be fabricated by evaporating, sputtering, or otherwise depositing a metal layer or metal layers 425 over a surface or surfaces 420 of the glass substrate 410, where the surface or surfaces 420 are appropriately etched or shaped to produce grooves and undercuts that provide isolation between electrodes formed by the metal layer 425. The surface 420 may be referred to as a top surface if it is the topmost surface of the glass substrate 410, for example. This metal layer 425 may be a single metal layer, however, multiple metal layers may also be used. The metal layer 425 may be made of pure metals or alloys. The electrodes that are formed over the surface 420 are routed from both ends of the ion trap (e.g., the distal ends of the ion trap) to a center or middle region 430 of the ion trap. As shown, at the distal ends of the trap the electrodes may be angled to facilitate wire bonding between the electrodes on the ion trap and electrical traces on a substrate or interposer onto which the ion trap is placed. It is in the region 430 that the other end of the electrodes terminate and where the ions 106 in the linear crystal or chain 110 illustrated in FIG. 1 are trapped. When the ion traps described herein are made by evaporation of the metal layer 425 the ion traps may be referred to as evaporated glass traps (EGTs) or, as mentioned above, they may be more generally referred to as metal-on-glass traps.

As a variation of the structure described above, rather than using a layer of metal 425, a layer of a non-metallic conductive coating 425 may be used instead. An example of a non-metallic conductive material is indium tin oxide (ITO), but other such materials may also be used. The term metal-on-glass trap may be used even in these types of structures to indicate a conductive electrode is used over a glass substrate.

As mentioned above, the ion trap shown in the diagram 400 in FIG. 4 includes features that provide for electrodes with metalized trenches and open light access. These ion traps may be fabricated by shaping the glass substrate 410 (e.g., by using laser writing and etching techniques) and then evaporating one or more metal layers 425 on top (see e.g., process details provided in FIG. 7). Regions shadowed by overhangs in the glass shape form disconnects between regions of metal, allowing for many isolated electrodes on a single device. Further shaping of the trap may be achieved by, for example, forming beveled, slanted, or angled cutout regions, which may provide light access improvements over that of a flat surface. For example, better access by a focused laser or optical beam can be provided to the trapped ions by removing portions of the trap that could otherwise interfere or clip the focused laser or optical beam. The metallization used in the evaporation process to form the electrodes may include a single metal (e.g., gold (Au)) or a layering of different metals (e.g., chromium (Cr) then Au). As mentioned above, metal alloys that provide the appropriate mechanical and electrical properties may also be used in the metal evaporation process.

Figure 5:
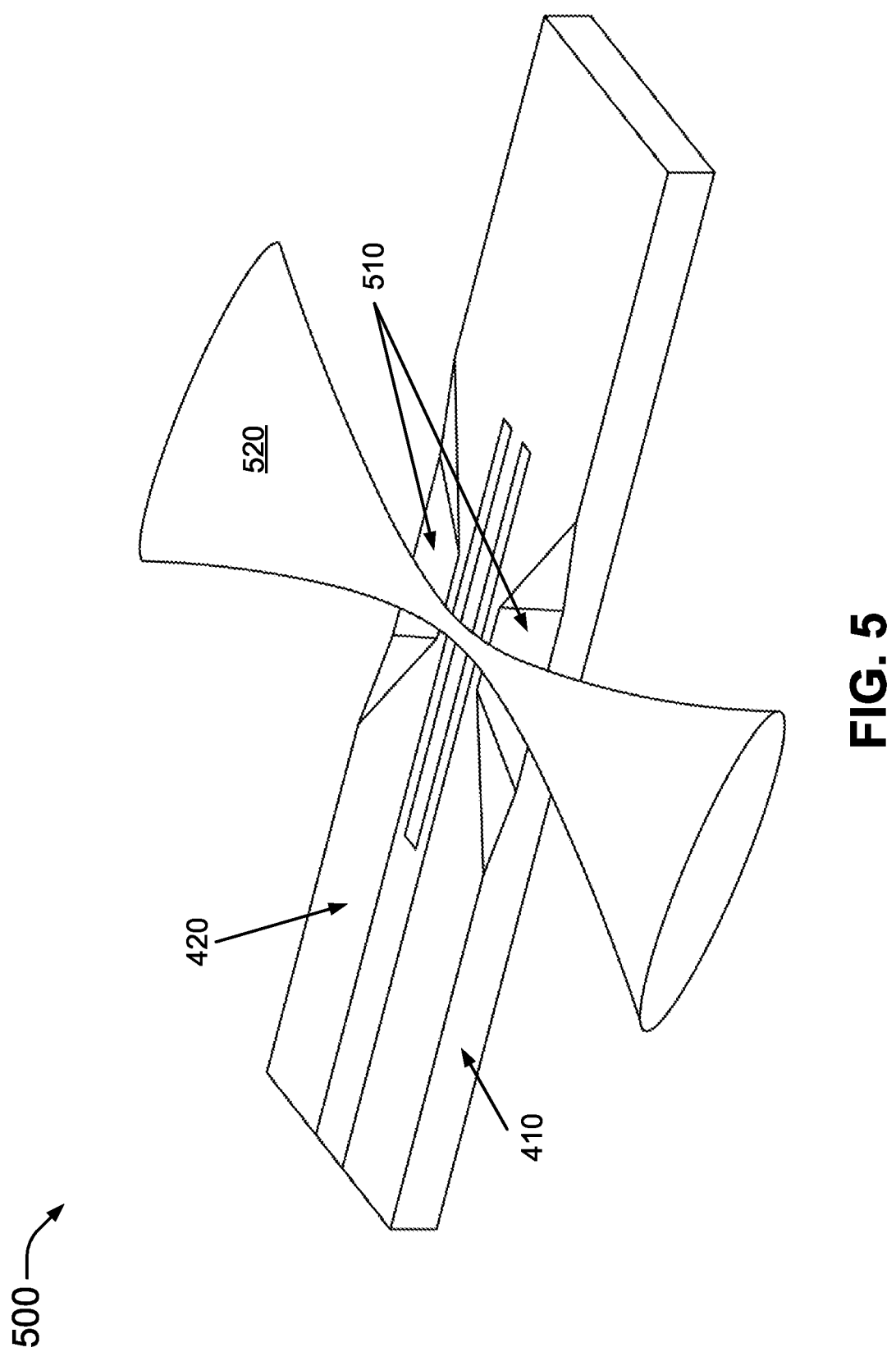
FIG. 5 illustrates an example of a metal-on-glass ion trap having high numerical aperture (NA) light access by using angled cutouts in connection with aspects of this disclosure.

FIG. 5 shows a diagram 500 that illustrates an example of metal-on-glass trap with high numerical aperture (NA) light access by having angled wings or cutouts 510. The surface 420 of the glass substrate 410 may be cut or shaped (e.g., by etching techniques) to form the cutouts 510 into the glass substrate 410 that allow a tightly focused laser beam 520 to reach the center of the metal-on-glass trap without clipping the laser beam 520. In this example, a cutout 510 is made on one side of the glass substrate 410 and another cutout 510 is made on the opposite side. In this way, the structure of the metal-on-glass trap provides the open light accessed mention above by allowing the laser beam 520 to narrow down to its smallest beam waist in the region of the metal-on-glass trap where the ions 106 are confined without being clipped at either side of the glass substrate 410. This provides for better focusing of the laser beam 520 and improved overall performance.

Moreover, by angling the cutouts 510, the features that create the electrodes (e.g., via shadowing structures described in more detail below in FIG. 7) may extend over these regions to improve the overall electrical connectivity of the ion trap. That is, the slopes or angles of the cutouts 510 still allow for electrodes to be routed over the regions of the cutouts 510 providing better overall connectivity since a larger portion of the metal-on-glass real estate may be used for routing.

In an alternative implementation, rather than having the cutouts 510 being angled, the wings could instead be flat (e.g., flat cutouts with sharp/step sidewalls) to provide better mechanical strength. This approach, however, may limit the overall electrical connectivity because the sharp edges of a flat wing may not allow for electrodes to extend through the regions of the cutouts 510. In this approach, a smaller portion of the metal-on-glass real estate may be used for routing, reducing the overall connectivity that may be achieved.

Figure 6:
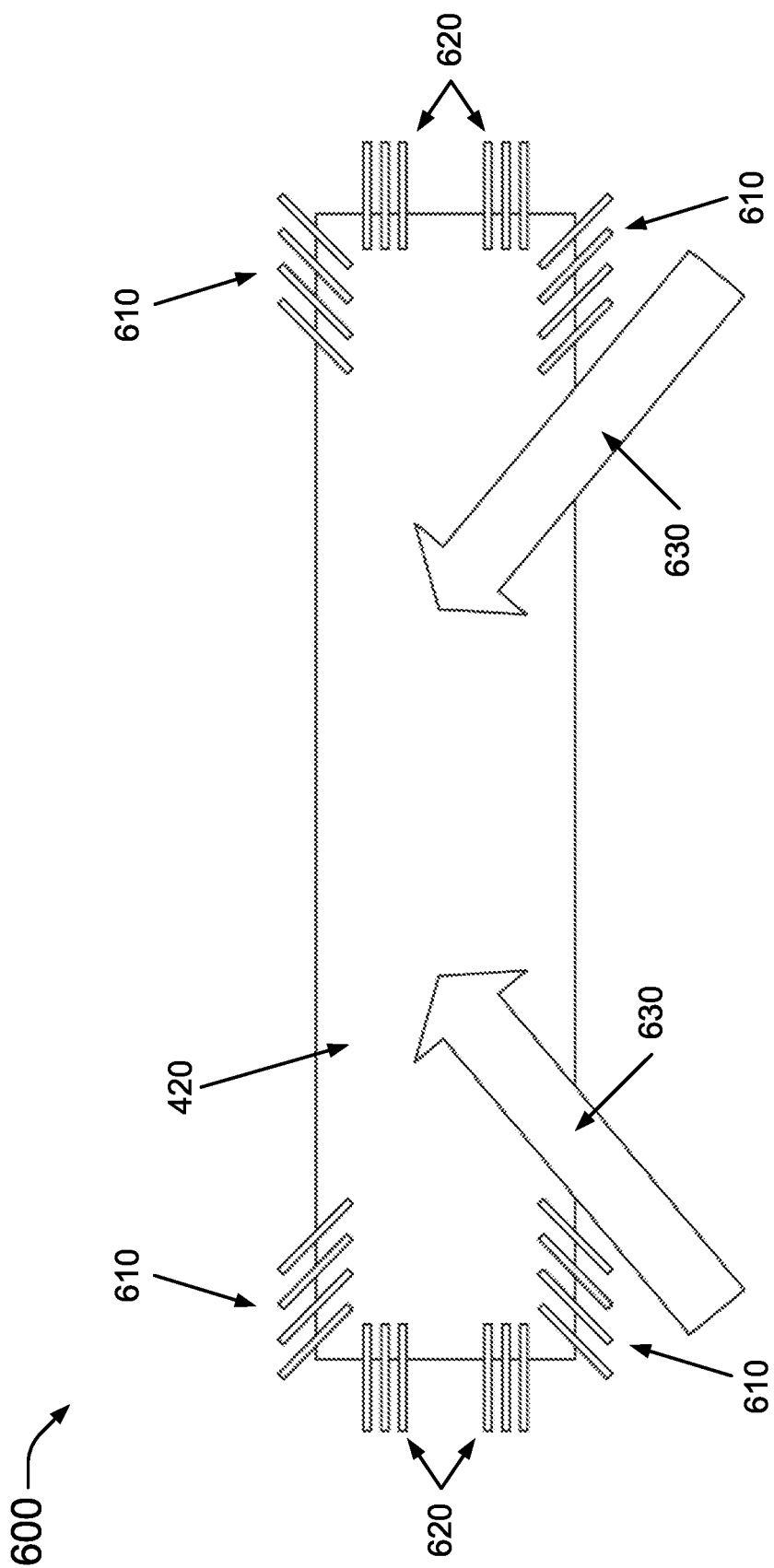
FIG. 6 illustrates a top view of an example of a metal-on-glass ion trap and the wire bonds used to make electrical connections to the electrodes of the ion trap in connection with aspects of this disclosure.

FIG. 6 shows a diagram 600 that illustrates a top view of a metal-on-glass trap and the wire bonds used to make electrical connections to the trap's electrodes. In this example, the electrodes formed on the top surface 420 are not shown for simplicity. What is shown are wire bonds 610 and 620 connected to the ends of the electrodes, where the outer ends of the wire bonds 610 and 620 connect to an electrical routing substrate (e.g., an interposer) on which the metal-on-glass trap is placed (not shown). The wire bonds 620 extend straight out of both ends of the metal-on-glass trap, while the wire bonds 610 are angled to provide additional clear access for laser beams 630. Although this example shows the wire bonds 610 at 45 degrees, the wire bonds 610 may be set at angles different from 45 degrees, for example in a range from 15 degrees or less to 60 degrees or more.

Therefore, in addition to the open access provided by the cutouts 510 shown in the diagram 500 in FIG. 5, the proposed structure for the metal-on-glass trap also allows more flexibility on the angle at which laser or optical beams may be applied as shown in the diagram 600 in FIG. 6.

Figure 7:
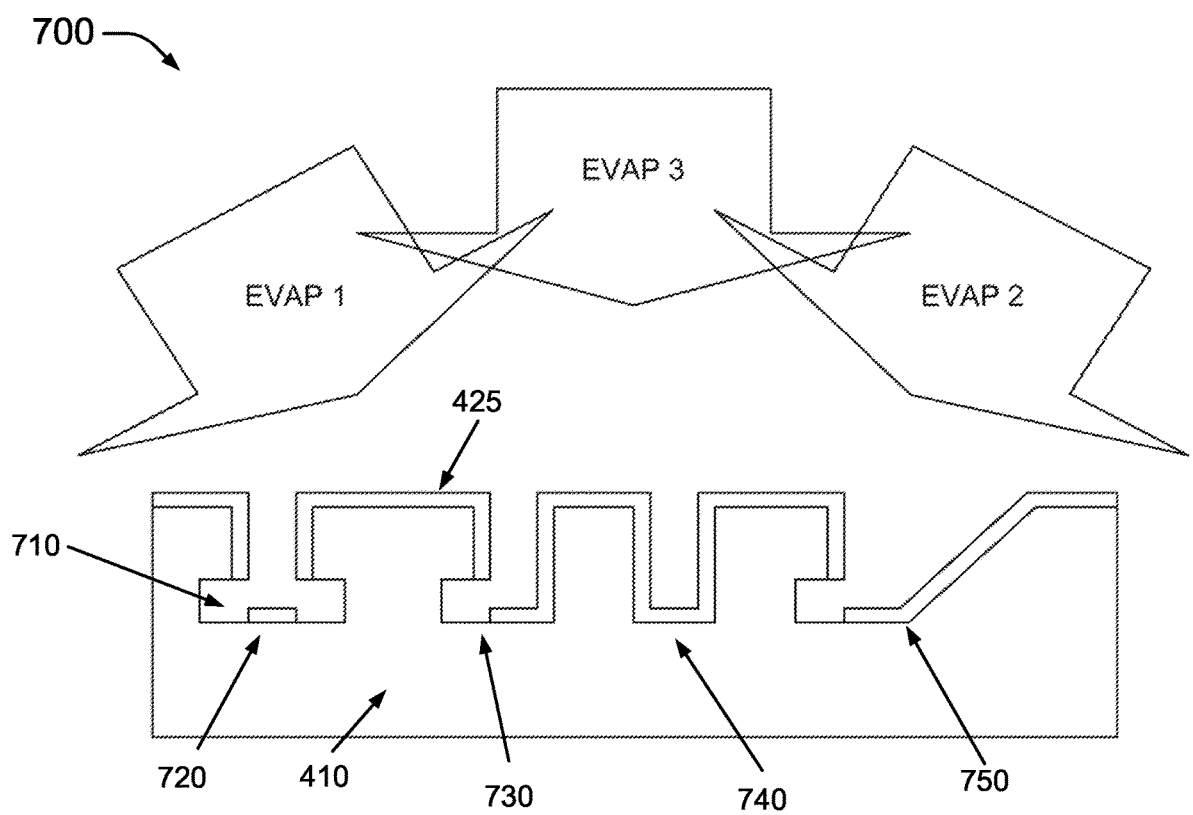
FIG. 7 illustrates a cross section of examples of electrode structures that may be used for the metal-on-glass ion trap in connection with aspects of this disclosure.

FIG. 7 shows a diagram 700 that illustrates a cross section of a metal-on-glass trap with different types of electrode or shadow structures that may be formed to produce the trap's electrodes. Each of the structures shown may be used in the trap fabrication for a particular use, including the formation of the electrodes and the electrode routing described above in connection with the diagrams 400, 500, and 600 in FIGS. 4-6.

The glass substrate 410 is processed by appropriately shaping the top surface. For example, the top surface may be shaped by using one or more different types of etching techniques to produce the different electrode or shadow structures. The glass substrate 410 is shaped first and then a metal coating (e.g., the metal layer 425) is evaporated over the glass substrate 410. As mentioned above, the metal coating may include a single metal (e.g., Au) or a layering of different metals (e.g., Cr then Au).

The metal coating may be deposited (e.g., via evaporation) at various discrete angles (e.g., see different evaporation angles EVAP 1, EVAP 2, and EVAP 3) to coat the top surface, the exposed bottom surfaces, the sidewalls, and the angled wings or sloped walls that result from the shaping of the top surface. The coating may either occur in steps with discrete angles to the deposition source, by continuous movement during the deposition process, or by a combination of both techniques. For example, evaporation at a certain angle is applied while the glass substrate 410 is moved, with subsequent operations performed with different angles while the glass substrate 410 is moved. The approach described herein may form isolated trap electrodes by, for example, implementing one or more of the following features: undercuts 710, undercut on both sides 720, undercut on one side 730, no undercut 740, and a sloped wall 750. In some cases, two undercut features may result in a complete undercut of a portion of an electrode or surrounding structures, with that portion bridging over the complete undercut to form a continuous electrode.

As a variation in the above fabrication, the coating can be a non-metal conductive coating such as indium tin oxide (ITO).

Figure 8:
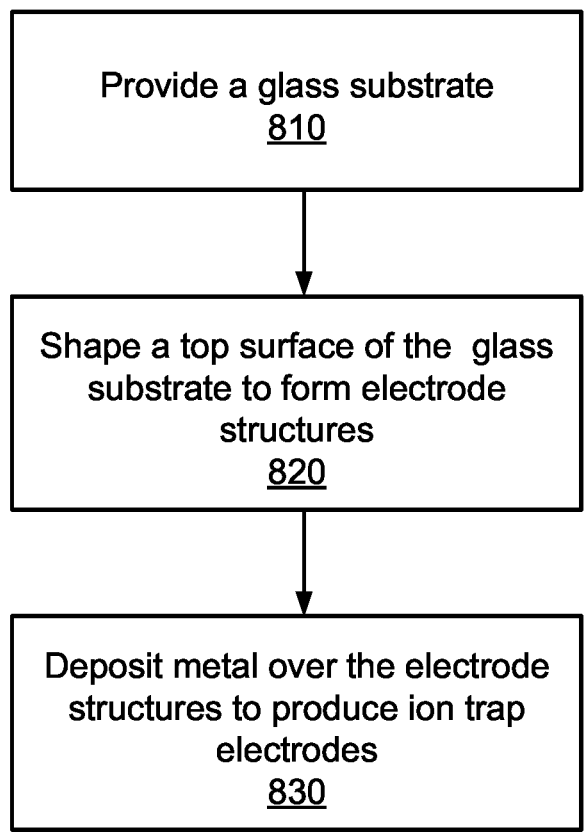
FIG. 8 illustrates a flow chart of a process for the fabrication of a metal-on-glass trap in connection with aspects of this disclosure.

FIG. 8 shows a flow chart of a method or process 800 for the fabrication of a metal-on-glass trap. At 810, a glass substrate (e.g., the glass substrate 410) is provided for the fabrication of the metal-on-glass trap. At 820, a top surface (e.g., the surface 420 or topmost surface 420) of the glass substrate is shaped to form electrode structures (e.g., the electrode structures 710, 720, 730, 740, and 750). At 830, one or more metal layers (e.g., the metal layer 425) are deposited (e.g., evaporated, sputtered) over the electrode structures of the shaped top surface to produce the electrodes of the metal-on-glass trap. The structures made by shaping the glass substrate provide the needed electrical isolation for the electrodes.

In another aspect of the method 800, the glass substrate is made of fused silica.

In another aspect of the method 800, the deposition of the one or more metal layers includes deposition of a layer of gold.

In another aspect of the method 800, the deposition of the one or more metal layers includes first the deposition of a layer of chromium and then the deposition of a layer of gold over the layer of chromium.

In another aspect of the method 800, the shaping of the top surface of the glass substrate is performed by one or more etching processes (e.g., chemical etching, laser etching, or a combination thereof).

In another aspect of the method 800, the shaping of the top surface of the glass substrate includes forming cutouts (e.g., the cutouts 510) on one or both sides of the metal-on-glass trap to provide open access for laser beams during operation of the metal-on-glass trap. The cutouts may be angled cutouts and at least a portion of the electrodes are routed through the regions of the angled cutouts, or the cutouts may be flat cutouts and none of the electrodes are routed through the regions of the flat cutouts.

In another aspect of the method 800, the deposition of the one or more metal layers includes evaporating using different evaporation angles, different evaporation steps, continuous motion, or a combination thereof. Example of different evaporation steps/angles are shown by EVAP 1, EVAP 2, and EVAP 3 in the diagram 700 in FIG. 7. For example, multiple evaporation angles are applied at the same time or several evaporation angles are applied in a sequence. In either case, the glass substrate may be held in a fixed position or may be moved during the evaporation process relative to the evaporation sources.

In another aspect of the method 800, for a portion of the electrodes of the metal-on-glass trap, ends of the electrodes near the distal ends of the ion trap are angled to allow angled wire bonds to an electrical routing substrate. The angled ends of the electrodes are angled between 15 degrees to 60 degrees, with 45 degrees being a typical angle.

In connection with the method or process 800 in FIG. 8 to fabricate metal-on-glass traps, also described is a metal-on-glass trap for holding atomic-based qubits that includes a glass substrate and electrodes made from metal deposited over electrode structures formed by shaping a top surface of the glass substrate. The glass substrate may be made of fused silica, for example. Moreover, the deposited metal (e.g., evaporated, sputtered) may include a layer of gold or may include a first layer of chromium and then a layer of gold over the first layer of chromium.

For metal-on-glass traps, the shaping of the top surface (or topmost surface) of the glass substrate includes cutouts on both sides of the metal-on-glass trap to provide open access for laser beams during operation of the metal-on-glass trap. The cutouts may be angled cutouts and at least a portion of the electrodes of the metal-on-glass trap are routed through the regions of the angled cutouts. Alternatively, the cutouts may be flat cutouts and none of the electrodes of the metal-on-glass trap are routed through the regions of the flat cutouts.

For a portion of the electrodes of metal-on-glass trap, ends of the electrodes near the distal ends of the metal-on-glass trap (e.g., far ends of the length of the metal-on-glass trap) are angled to allow angled wire bonds for connectivity to an electrical routing substate (e.g., a carrier or interposer). The electrodes may be angled between 15 degrees to 60 degrees.

A QIP system, such as the QIP system 200 in FIG. 2, for example, may include a chamber, and a metal-on-glass trap for holding atomic-based qubits, where the metal-on-glass trap is inside the chamber. The metal-on-glass trap may be as described herein. For example, the metal-on-glass trap may include a glass substrate, and electrodes made from metal deposited over electrode structures formed by shaping a top surface of the glass substrate. The QIP system may also include an optical and trap controller configured to control the generation of signals to be applied to the electrodes of the metal-on-glass trap.

The previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated.

Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method of fabricating a metal-on-glass trap for holding atomic-based qubits, comprising:
   providing a glass substrate;
   shaping a top surface of the glass substrate to form electrode structures; and
   depositing one or more metal layers over the electrode structures of the shaped top surface to produce the electrodes of the metal-on-glass trap,
   wherein the shaping of the top surface of the glass substrate includes forming wing cutouts on both side-edges of the metal-on-glass trap to provide open access for laser beams during operation of the metal-on-glass trap.

2. The method of claim 1, wherein the glass substrate is made of fused silica.

3. The method of claim 1, wherein the depositing of the one or more metal layers includes evaporating a layer of gold.

4. The method of claim 1, wherein the depositing of the one or more metal layers includes first evaporating a layer of chromium and then a layer of gold.

5. The method of claim 1, wherein the shaping of the top surface of the glass substrate is performed by one or more etching processes.

6. The method of claim 1, wherein:
   the cutouts are angled cutouts and at least a portion of the electrodes of the metal-on-glass trap are routed through the regions of the angled cutouts, or
   the cutouts are flat cutouts and none of the electrodes of the metal-on-glass trap are routed through the regions of the flat cutouts.

7. The method of claim 1, wherein the depositing of the one or more metal layers includes evaporating of the one or more metal layers using different evaporation angles, different evaporation steps, continuous motion evaporation, or a combination thereof.

8. The method of claim 1, wherein for a portion of the electrodes of the metal-on-glass trap, ends of the electrodes near the distal ends of the metal-on-glass trap are angled to allow angled wire bonds for connectivity to an electrical routing substrate.

9. The method of claim 8, wherein the angled ends of the electrodes are angled between 15 degrees to 60 degrees.

10. A metal-on-glass trap for holding atomic-based qubits, comprising:
    a glass substrate; and
    electrodes made from metal deposited over electrode structures configured by shaping a top surface of the glass substrate,
    wherein the shaping of the top surface of the glass substrate includes wing cutouts on both side-edges of the metal-on-glass trap that are configured to provide open access for laser beams during operation of the metal-on-glass trap.

11. The trap of claim 10, wherein the glass substrate is made of fused silica.

12. The trap of claim 10, wherein the deposited metal includes a layer of gold.

13. The trap of claim 10, wherein the deposited metal includes first a layer of chromium and then a layer of gold.

14. The trap of claim 10, wherein the cutouts are angled cutouts and at least a portion of the electrodes of the metal-on-glass trap are routed through the regions of the angled cutouts.

15. The trap of claim 10, wherein the cutouts are flat cutouts and none of the electrodes of the metal-on-glass trap are routed through the regions of the flat cutouts.

16. The trap of claim 10, wherein for a portion of the electrodes of metal-on-glass trap, ends of the electrodes near the distal ends of the metal-on-glass trap are angled to allow angled wire bonds for connectivity to an electrical routing substate.

17. The trap of claim 16, wherein the angled ends of the electrodes are angled between 15 degrees to 60 degrees.

18. A quantum information processing (QIP) system, comprising:
    a chamber;
    a metal-on-glass trap for holding atomic-based qubits, the metal-on-glass trap being inside the chamber and the metal-on-glass trap including:
    a glass substrate, and
    electrodes made from metal deposited over electrode structures that are configured by shaping a top surface of the glass substrate, the shaping of the top surface of the glass substrate including wing cutouts on both side-edges of the metal-on-glass trap that are configured to provide open access for laser beams during operation of the metal-on-glass trap; and
    an optical and trap controller configured to control the generation of signals to be applied to the electrodes of the metal-on-glass trap.

\* \* \* \* \*